United States Patent
Dean, Jr.

[15] 3,641,837
[45] Feb. 15, 1972

[54] VEHICLE ACCELERATOR PEDAL
[72] Inventor: Ralph Dean, Jr., Fenton, Mich.
[73] Assignee: General Motors Corporation, Detroit, Mich.
[22] Filed: Sept. 28, 1970
[21] Appl. No.: 76,102

[52] U.S. Cl..................................................74/513, 74/560
[51] Int. Cl. ............................................................G05g 1/14
[58] Field of Search ............................74/561, 560, 513, 512

[56] References Cited

UNITED STATES PATENTS

| | | | |
|---|---|---|---|
| 3,151,498 | 10/1964 | Wilson et al. | 74/560 |
| 3,164,031 | 1/1965 | Rubissow | 74/513 |

*Primary Examiner*—Meyer Perlin
*Assistant Examiner*—F. D. Shoemaker
*Attorney*—W. E. Finken and Herbert Furman

[57] ABSTRACT

A vehicle accelerator pedal has its upper end pivoted to one end of a throttle linkage control member, the other end of which is pivoted to the vehicle firewall. The vehicle floor pan is welded to the firewall and supports a slide plate which is slidably engaged by the lower end of the pedal. As the pedal is moved from a raised position to a partially depressed position, where the engagement between the lower end of the pedal is aligned with the pivotal connections of the control member, the lower end of the pedal slides along the slide plate in one direction. As the pedal is moved from the partially depressed position to a fully depressed position, the lower end of the pedal slides along the slide plate in the opposite direction.

2 Claims, 3 Drawing Figures

PATENTED FEB 15 1972

3,641,837

INVENTOR.
Ralph Dean, Jr.
BY
Herbert Furman
ATTORNEY

VEHICLE ACCELERATOR PEDAL

This invention relates to a vehicle accelerator pedal whose lower end slidably engages a vehicle floor.

It is well known to provide a vehicle accelerator pedal whose lower end is pivoted to the floor and whose upper end is connected to a throttle linkage control member. It is also well known to provide a vehicle accelerator pedal that is suspended by a throttle linkage control member.

This invention provides a vehicle accelerator pedal that is pivoted to a throttle linkage control member and whose lower end slidably engages the vehicle floor.

One feature of this invention is that it provides a vehicle accelerator pedal whose upper end is pivoted to a throttle linkage control member and whose lower end slidably engages the vehicle floor during movement of the pedal between raised and depressed positions. Another feature of this invention is that the lower end of the pedal slides in one direction during movement of the pedal between the raised position and a partially depressed position and slides in the opposite direction during movement of the pedal from the partially depressed position to the fully depressed position.

These and other features of this invention will be apparent from the following description and drawings in which.

Figure 1:
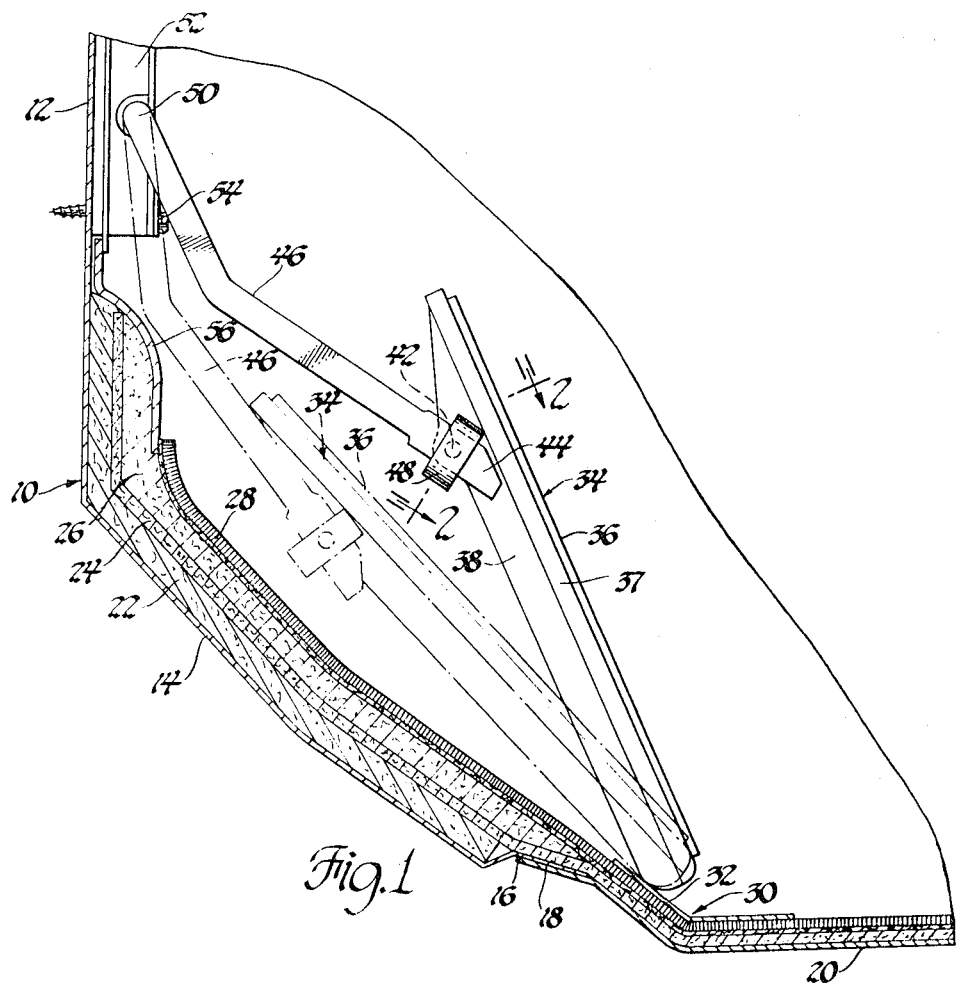
FIG. 1 is a sectional view of a portion of a vehicle that includes an accelerator pedal, according to the invention, shown in a solid line indicated raised position and a phantom line indicated fully depressed position.
Figure 2:
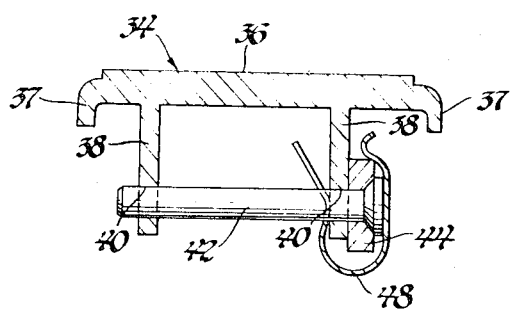
FIG. 2 is an enlarged sectional view of the pedal taken along line 2—2 of FIG. 1.
Figure 3:
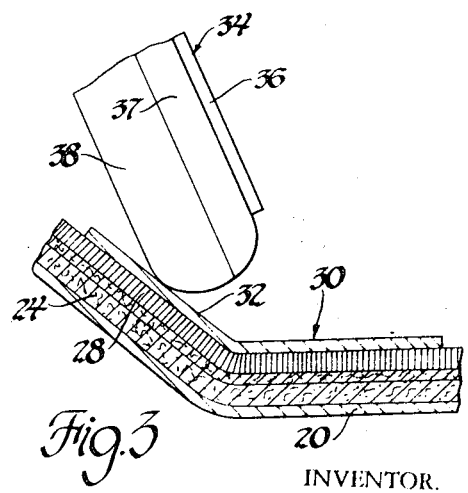
FIG. 3 is an enlarged view of a portion of FIG. 1.

Referring now to FIG. 1, a vehicle firewall generally indicated at 10 includes a vertical portion 12 and a rearwardly extending portion 14 that has a flange 16 welded to a flange 18 of a vehicle floor pan 20. A layer of insulation 22, an underlay 24, a layer of padding 26, and a layer of carpet 28 complete the conventional vehicle body structure.

A V-shaped slide plate generally indicated at 30 is adhesively or otherwise suitably secured to the layer of carpet 28 and includes an inclined slide portion 32. An accelerator pedal generally indicated at 34 includes a foot engageable portion 36, a pair of spaced trim flanges 37, and a pair of spaced web portions 38 that extend along the length of pedal 34. At their upper ends, web portions 38 include apertures 40 which receive the shank of a headed pin 42. The head of the pin 42 is received within a flattened apertured end portion 44 of a throttle linkage control member 46. A U-shaped spring clip 48 has one leg snapped over the head of pin 42 and end portion 44, while the other leg, which is forked, engages the inside of the adjacent web portion 38 on opposite sides of the shank of pin 42. The pin 42 thus maintains a pivotal connection between control member 46 and pedal 34. Control member 46 includes an offset portion 50 that is pivoted to firewall portion 12 by a conventional control linkage saddle member 52 secured in position by a plurality of screws 54, only one of which is shown. A stop member 56 is secured to the lower end of member 52 and prevents depression of pedal 34 past the phantom line indicated throttle open fully depressed position.

When the pedal 34 is in the solid line indicated raised position, the throttle is open and the center of gravity of pedal 34 is rearward of pin 42 such that gravity biases the curved lower ends of web portions 38 into engagement with slide portion 32. When the driver initially moves the pedal 34 from the raised position toward the depressed position, the curved lower ends of web portions 38 slide along slide portion 32 downwardly and rearwardly, or to the right. When pedal 34 reaches a partially depressed position in which the axes of pin 42 and offset portion 50 are aligned with the line of engagement between slide portion 32 and web portions 38, further depression of the pedal 34 toward the fully depressed position causes the curved lower ends of web portions 38 to slide upwardly and forwardly, or to the left, along slide portion 32.

Thus, the lower end of the accelerator pedal engages the vehicle floor and slides in one direction relative thereto upon movement of the pedal from a raised position to a partially depressed position and slides in the opposite direction relative to the vehicle floor upon movement of the pedal from the partially depressed position to the fully depressed position.

What is claimed is:

1. In a vehicle including a firewall having a floor extending therefrom and a throttle linkage control member pivoted thereto, the combination comprising, an accelerator pedal, means pivoting the upper end of the pedal to an end of the control member, and slide means on the vehicle floor, the lower end of the pedal slidably engaging the slide means during movement of the pedal between a raised position and a depressed position.

2. In a vehicle including a firewall having a floor extending therefrom and a throttle linkage control member pivoted thereto, the combination comprising, an accelerator pedal, means pivoting the upper end of the pedal to an end of the control member, and slide means on the vehicle floor normally engaged by the lower end of the pedal, the lower end of the pedal sliding along the slide a means in one direction during movement of the pedal from a raised position to a partially depressed position in which the pivotal connections of the control member are aligned with the engagement between the slide means and the lower end of the pedal, the lower end of the pedal sliding along the slide means in the opposite direction during movement of the pedal from the partially depressed position to a fully depressed position.

* * * * *